United States Patent
Darolia et al.

(10) Patent No.: US 6,551,061 B2
(45) Date of Patent: Apr. 22, 2003

(54) PROCESS FOR FORMING MICRO COOLING CHANNELS INSIDE A THERMAL BARRIER COATING SYSTEM WITHOUT MASKING MATERIAL

(75) Inventors: Ramgopal Darolia, West Chester, OH (US); Ching-Pang Lee, Cincinnati, OH (US); Robert Edward Schafrik, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 73 days.

(21) Appl. No.: 09/818,311

(22) Filed: Mar. 27, 2001

(65) Prior Publication Data

US 2002/0141872 A1 Oct. 3, 2002

(51) Int. Cl.$^7$ ................................. F01D 5/18
(52) U.S. Cl. ................. 416/97 A; 416/241 B; 29/889
(58) Field of Search ............. 416/97 A, 97 R, 416/92, 241 R, 241 B; 29/889, 889.2

(56) References Cited

U.S. PATENT DOCUMENTS 6,408,610 B1 * 6/2002 Caldwell et al. ............ 29/889.2

* cited by examiner

Primary Examiner—Edward K. Look
Assistant Examiner—Kimya N McCoy
(74) Attorney, Agent, or Firm—David L. Narciso; McNees, Wallace & Nurick

(57) ABSTRACT

The present invention provides a process for forming active convection cooling micro channels within or adjacent to a bond coat layer applied to a turbine high pressure turbine airfoil. When placed adjacent or within a porous TBC, the micro channels additionally provide transpiration cooling through the porous TBC. The micro channels communicate directly with at least one cooling circuit contained within the airfoil from which they receive cooling air, thereby providing direct and efficient cooling for the bond coat layer. Because the substrate includes an actively cooled flow path surface region that can reduce the cooling requirement for the substrate, the engine can run at a higher firing temperature without the need for additional cooling air, achieving a better, more efficient engine performance. In one embodiment, a metallic bond coat is applied to an airfoil. The bond coat is grooved such that the grooves are structured, with at least one structured micro groove communicating with at least one cooling fluid supply contained within the airfoil. A TBC layer is applied over the structured grooves, resulting in the formation of hollow micro channels for the transport of the cooling fluid due to self-shadowing. In different embodiments, the location of the structured grooves, hence, the resulting micro channels are placed within the airfoil substrate at the substrate/bond coat interface or within the TBC layer.

27 Claims, 1 Drawing Sheet

PROCESS FOR FORMING MICRO COOLING CHANNELS INSIDE A THERMAL BARRIER COATING SYSTEM WITHOUT MASKING MATERIAL

CROSS-REFERENCE TO RELATED APPLICATIONS

This application is related to co-pending applications assigned to the assignee of the present invention which are identified as Ser. No. 09/818,385, entitled "Turbine Airfoil Trailing Edge With Micro Cooling Channels" and Ser. No. 09/818,312, entitled "Turbine Blade Tip With Thermal Barrier Coating Formed With Micro Cooling Channels," and references co-pending applications assigned to the assignee of the present invention, which are identified as Ser. No. 09/707,023 entitled "Directly Cooled Thermal Barrier Coating System", Ser. No. 09/707,024 entitled "Multi-layer Thermal Barrier Coating with Integrated Cooling System" and Ser. No. 09/707,027 and titled "Integrated Cooling in Thermal Barrier Coating", the contents of which are incorporated herein by reference.

FIELD OF THE INVENTION

This invention relates generally to gas turbine engines, and in particular, to a process for cooling a flow path surface region on a turbine airfoil.

BACKGROUND OF THE INVENTION

In gas turbine engines, for example, aircraft engines, air is drawn into the front of the engine, compressed by a shaft-mounted rotary-type compressor, and mixed with fuel. The mixture is burned, and the hot exhaust gases are passed through a turbine mounted on a shaft. The flow of gas turns the turbine, which turns the shaft and drives the compressor and fan. The hot exhaust gases flow from the back of the engine, driving it and the aircraft forward.

During operation of gas turbine engines, the temperatures of combustion gases may exceed 3,000° F., considerably higher than the melting temperatures of the metal parts of the engine aft of the compressor, which are in contact with these hot gases. Operation of these engines at gas temperatures that are above the metal part melting temperatures is a well established art, and depends in part on supplying a cooling fluid to the outer surfaces of the metal parts through various methods. Metal parts of these engines that are particularly subject to high temperatures, and thus require particular attention with respect to cooling, are, for example, combustor liners and the metal parts located aft of the combustor including high pressure turbine airfoils, such as turbine blades and turbine vanes.

The hotter the turbine inlet gases, the more efficient is the operation of the jet engine. There is thus an incentive to raise the turbine inlet gas temperature. However, the maximum temperature of the turbine inlet gases is normally limited by the materials used to fabricate the components downstream of the combustors such as the vanes and the blades of the turbine. In current engines, the turbine vanes and blades are made of nickel-based superalloys, and can operate at temperatures of up to 2100°-2200° F. with appropriate well-known cooling techniques.

The metal temperatures can be maintained below their melting levels with current cooling techniques by using a combination of improved active cooling designs and thermal barrier coatings (TBCs). For example, with regard to the metal blades and vanes employed in aircraft engines, some cooling is achieved through convection by providing passages for flow of cooling air from the compressor internally within the blades so that heat may be removed from the metal structure of the blade by the cooling air. Such blades have intricate serpentine passageways within the structural metal forming the cooling circuits of the blade.

Small internal orifices have also been devised to direct this circulating cooling air directly against certain inner surfaces of the airfoil to obtain cooling of the inner surface by impingement of the cooling air against the surface, a process known as impingement cooling. In addition, an array of small holes extending from a hollow core through the blade shell can provide for bleeding cooling air through the blade shell to the outer surface where a film of such air can protect the blade from direct contact with the hot gases passing through the engines, a process known as film cooling.

In another approach, a TBC is applied to the turbine blade component, which forms an interface between the metallic component and the hot gases of combustion. The TBC includes a ceramic coating that is applied to the external surface of metal parts to impede the transfer of heat from hot combustion gases to the metal parts, thus insulating the component from the hot combustion gas. This permits the combustion gas to be hotter than would otherwise be possible with the particular material and fabrication process of the component.

TBCs include well-known ceramic materials, such as, for example, yttrium-stabilized zirconia (YSZ). Ceramic TBCs usually do not adhere well directly to the superalloys used as substrate materials. Therefore, an additional metallic layer called a bond coat is placed between the substrate and the TBC. The bond coat may be made of an overlay alloy, such as a MCrAlX, or other composition more resistant to environmental damage than the substrate, or alternatively, the bond coat may be a diffusion nickel aluminide or platinum aluminide. The surface of the bond coat oxidizes to form a thin, protective aluminum oxide scale that provides improved adherence to the ceramic top coatings. The bond coat and overlying TBC are frequently referred to as a thermal barrier coating system.

Improved environmental resistance to destructive oxidation and hot corrosion is desirable. Additionally, the alloying elements of the bond coat interdiffuse with the substrate alloy at elevated temperatures of operation, changing the composition of the protective outer layer. Over time, as the airfoils are refurbished, walls of the airfoils are consumed, which reduces load carrying capability and limits blade life. Also, this interdiffusion can also reduce environmental resistance of the coating, causing loss of material, as layers of material are lost due to corrosive and oxidative effects. This interdiffusion and its adverse effects can be reduced by controlling the temperature of the component in the region of the bond coat/substrate interface.

In previous and existing designs, the bond coat temperature limit is critical to the TBC's life and has had an upper limit of about 2100° F. Once the bond coat exceeds this temperature, the coating system will quickly deteriorate, due to high temperature mechanical deformation and accelerated oxidation, as well as from accelerated interdiffusion of bond coat elements with those from the substrate alloy and subsequent degradation due to loss of its superior environmental resistance. The coating system ultimately can separate from the substrate exposing the underlying superalloy component to further deterioration from the hot gases.

Even with the use of advanced cooling designs and thermal barrier coating systems, it is also desirable to decrease the requirement for cooling fluid, because reducing the demand for cooling fluid also contributes to improving overall engine operating efficiency. One way to achieve such a reduction is to improve the current cooling techniques for the metal parts immediately adjacent to their outer surfaces.

A process of cooling these metal parts has been set forth in a co-pending application identified as Attorney Docket No. 13DV-13513 entitled "Directly Cooled Thermal Barrier Coating System", in which micro channels were created within or adjacent to the bond coat layer. Alternatively, when formed adjacent to or within a porous TBC, the micro channels additionally provide transpiration cooling through the porous TBC. The micro channels communicate directly with at least one cooling circuit contained within the blade or vane from which they receive cooling fluid, thereby providing direct and efficient cooling for the bond coat layer. The micro channels may be parallel to one another or they may intersect to form a cooling mesh. In this manner, the component includes an actively cooled flow path surface region that can improve the cooling of the substrate without increasing the demand for cooling fluid, and the engine can run at a higher firing temperature without the need for additional cooling fluid, thereby achieving a better, more efficient engine performance.

These micro channels are formed by masking the substrate surface with a masking material in a preselected pattern. The masking material permits the formation of a pattern, upon application of material, on the surface overlying at least one cooling fluid supply circuit contained within the component. The masking material is subsequently removed, leaving hollow micro channels to actively cool the flow path surface region. Depending on the desired location of the micro channels, the masking material may be placed directly on the superalloy substrate, then covered with the bond coat. Alternatively, the bond coat may be applied to the superalloy component followed by placement of the masking material on the bond coat, which now serves as a substrate. Alternatively, TBC system may be employed wherein the masking material is placed upon a deposited layer of TBC, which then serves as the substrate for formation of micro channels.

Utilizing a masking material that must later be removed adds additional manufacturing time and expense. Thus, there is an ongoing need for improved methods for economically creating micro channels used to improve the environmental resistance and long-term stability of the thermal barrier coating system, so that higher engine efficiencies can be obtained. The present invention fulfills this need, and further provides related advantages.

SUMMARY OF THE INVENTION

The present invention provides a process of creating active cooling micro channels within or adjacent to a bond coat layer without the use of masking materials. When placed adjacent to or within a porous TBC, the micro channels allow for cooling of the bond coat while additionally provide transpiration cooling through the porous TBC. The micro channels are positioned to communicate directly with at least one cooling circuit internal to the turbine engine component, which cooling circuit is the source of cooling fluid to the micro channels, thereby providing direct and efficient cooling for the bond coat layer. Because these micro channels provide an actively cooled flow path surface region for the substrate that can reduce the cooling requirement for the substrate or improve the cooling capability of the substrate using existing cooling fluid requirements, the engine can run at a higher firing temperature without the need for additional cooling air, achieving a better, more efficient engine performance.

In one embodiment, the present invention utilizes the unique line of sight feature of electron beam physical vapor deposition (EB-PVD) to deposit a material onto a surface containing structured micro grooves that have been fabricated into the surface. The shadowing effect of the subsequent material deposits on the peaks of the micro grooves and bridging over the valleys creates micro channels as the material deposits over the structured micro grooves.

When fabricated adjacent to and in fluid communication with, or within a porous TBC, the micro channels provide both active and transpiration cooling through the porous TBC. The micro channels are placed to communicate directly with at least one cooling circuit contained within the jet engine turbine component, from which they receive cooling fluid, thereby providing direct and efficient cooling for the TBC system. The result is a substrate having an actively cooled flow path surface region that can reduce the cooling requirement for the component.

The present invention further comprises the cooled flow path surface region of the jet engine turbine component formed by the foregoing processes and the turbine component with the patterned micro channels formed in the surface region by the foregoing methods for cooling the component. The location of the micro channels may be at any preselected position at the flow path surface or in the vicinity of the flow path surface region, for example, within the airfoil substrate at the substrate/bond coat interface, within the bond coat at the bond coat/TBC interface, or entirely within a TBC layer.

An advantage of the present invention is the micro channel that provides active cooling to the flow path surface region of the coated gas turbine component is fabricated in a cost-effective manner.

In one embodiment, the active convection cooling through the micro channels occurs within or adjacent to the bond coat layer, providing direct and efficient cooling for the bond coat layer. The substrate, upon which is deposited the bond coat layer, will also benefit from the cooling provided by the micro channels.

Another advantage of the present invention is that the actively cooled bond coat layer will allow engine components to run at higher operating temperatures to achieve a better engine performance. By removing heat from this region, the integrity of the bond coat can be maintained at higher engine operating temperatures, and diffusion of the bond coat elements with elements from the substrate will be retarded.

Still another advantage of the present invention is that cooling air flowing through the porous TBC will assist in lowering the TBC temperature by removing heat, thereby improving the TBC's thermal insulation efficiency.

Other features and advantages of the present invention will be apparent from the following more detailed description of the preferred embodiment, taken in conjunction with the accompanying figures which illustrate, by way of example, the principles of the invention.

DETAILED DESCRIPTION OF THE INVENTION

In addition to the process of fabricating micro channels into turbine engine components such as airfoils, which can be used for cooling the airfoil, the present invention sets forth methods for actively cooling the flow path surface region of a coated gas turbine airfoil component and the airfoil component produced by those methods.

Substrate materials often used in turbine parts or airfoils for aircraft engines and power generation equipment may include nickel, cobalt, or iron based superalloys. The alloys may be cast or wrought superalloys. Examples of such substrates are GTD-111, GTD-222, René80, René41, René125, René77, RenéN4, RenéN5, RenéN6, $4^{th}$ generation single crystal superalloy—MX-4, Hastelloy X, and cobalt-based HS-188. The usage of these materials at elevated temperatures is limited by their environmental properties in oxidative and corrosive environments at these elevated temperatures.

Bond coats applied to the substrate materials set forth above are used for both increased environmental protection and to facilitate adherence of additional layers to the substrate. Bond coats, comprised of materials referred to as MCrAl(X)s, are applied to the substrate by physical vapor deposition (PVD) processes such as electron beam evaporation (EB), ion-plasma arc evaporation, sputtering, or by plasma spray processes such as air plasma spray (APS), high velocity oxy-fuel (HVOF) or low pressure plasma spray (LPPS). Deposition temperatures for such processes can be 1800° F. or higher. PVD processes are applied in a vacuum, while thermal sprays can be controlled so as to be applied under non-oxidizing conditions.

Figure 1:
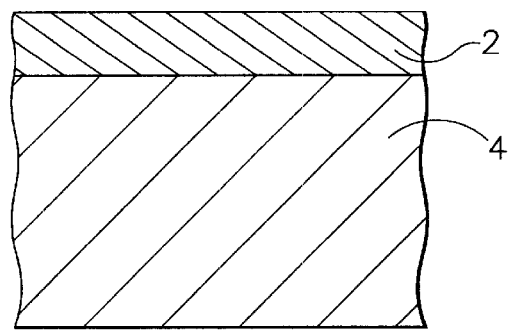
FIG. 1 is a representation of a form of the bond coat deposited on a substrate.

Referring now to FIG. 1, a bond coat 2 is applied to a substrate 4 using known techniques to a thickness of about 0.0005 inch to about 0.010 inch, preferably about 0.002 inch in thickness. The bond coat 2 must have sufficient thickness so that a structured micro groove 6 (described below) can be formed within bond coat 2. For example, bond coat 2 may be a diffusion aluminide, such NiAl or PtAl base alloy developed to the appropriate thickness by, for example, vapor phase aluminiding or chemical vapor deposition (CVD) and subsequent heat treatment, as required. Alternatively, the bond coat may be a MCrAl(X) where M is an element selected from the group consisting of Fe, Co and Ni and combinations thereof and (X) is an element selected from the group of gamma prime formers and solid solution strengtheners consisting of, for example, Ta, Re, reactive elements, such as Y, Zr, Hf, Si, and, grain boundary strengtheners consisting of B and C, and combinations thereof, in which deposition is by PVD or by thermal spray.

Figure 2:
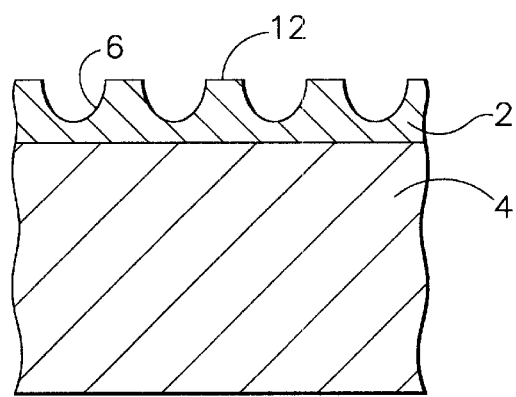
FIG. 2 is a representation of a form of the micro grooves created in the bond coat.

Turning now to FIG. 2, after the bond coat 2 has been deposited, at least one structured micro groove 6 is fabricated within the bond coat 2, for example, by laser machining, electrochemical machining (ECM), electro-discharge machining (EDM) or photolithography. The size, spacing and position of the grooves on the substrate are variable to fit localized needs, such as hot spots. In one preferred embodiment, the groove size and spacing are about 0.0005 inch to about 0.010 inch, preferably about 0.002 inch, with the structured micro groove 6 positioned in the bond coat substantially parallel to the substrate surface. Optionally, at least two structured micro grooves 6 can be fabricated to intersect, thereby forming structured micromesh.

Figure 3:
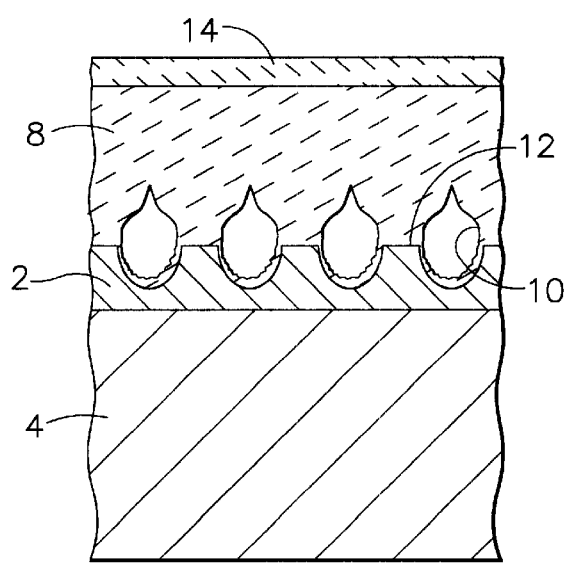
FIG. 3 is a representation of a form of the micro channels formed by the shadowing technique of the present invention.

The cross section of the structured micro groove 6 may assume any geometric form, for example, a rectangle, a circle, a triangle or any other shape that will facilitate the flow of cooling fluid. At least one structured micro groove 6 is in fluid communication with a fluid supply source (not shown) located within the component. A first TBC 8, shown in FIG. 3, is then applied over bond coat 2 containing the structured micro grooves 6 using known techniques, such as, for example, electron beam physical vapor deposition (EB-PVD) process, to a thickness in the range of from about 0.001" to about 0.05", preferably about 0.001" to about 0.020" and most preferably about 0.005" thickness.

As the first TBC 8 is deposited onto the grooved surface, micro channels 10 are formed as the applied material bridges grooves 6, due to the shadowing effect of the TBC 8 as it deposits on peaks 12 (FIG. 2) of the micro grooves 6. The shadowing effect may be best visualized by placing an object in front of a light source and observing the shadow cast by that object. Light rays passing around the object is representative of TBC being deposited, while the shadow cast by the object is representative of the void in the deposited first TBC. It is this void which ultimately forms structured micro channel 10.

The dimensions of the micro channel 10, in cross section, is about 0.001 to about 0.020 inch in diameter, when circular, and may be arcuate or may assume other geometric forms having equivalent dimensions, that is, yielding an equivalent cross-section size. The cross section of the micro channel 10 may take any preselected form such as, for example, a parallelogram, rectangle, an oval, a triangle or a circle.

The first TBC layer 8 is generally a porous TBC layer and is the subject of a co-pending application assigned to the assignee of the present invention, which is identified as Attorney Docket No. 13DV-13528 and titled "Integrated Cooling in Thermal Barrier Coating". Since the first TBC is porous, some of the cooling fluid can flow through the first TBC to provide transpirational cooling of the first TBC layers 8.

Optionally, a second, more dense outer layer of TBC 14 may be added over first TBC layer 8 to further direct the flow of cooling fluid as described in a co-pending application identified as Attorney Docket No. 13DV-13527 entitled "Multi-layer Thermal Barrier Coating with Integrated Cooling System", in which the ceramic thermal barrier portion of the thermal barrier system is processed to have a varying density, and hence variable porosity. The TBC's may be the well-known yttrium stabilized zirconia, YSZ. Alternatively, the dense TBC can be a different ceramic, such as a thin layer of $Al_2O_3$, zirconia modified by other refractory oxides such as oxides formed from Group IV, V and VI elements or oxides modified by Lanthanide series elements such as La, Nd, Gd, Yb and the like.

In this manner, cooling fluid is allowed to flow through micro channel 10 and further spread through the first TBC layer 8, providing transpiration cooling before exiting to the gas stream.

Cooling fluid (not shown), for example, air, is thereby routed from a cooling fluid supply (not shown) in the turbine component into at least one micro channel 10. After passage through micro channel 10, the cooling fluid (not shown), whose temperature increases as it removes heat from the component surface region, is expelled, typically into the gas stream. In this manner, the bond coat 2 is kept at a reduced temperature through active convection cooling.

In another embodiment of the present invention, the structured micro grooves are partially machined into the turbine component, for example, by a laser, by an ECM technique, cast during manufacture of the turbine component, or etched into the surface of the turbine component. A bond coat is applied to the substrate using conventional application techniques as previously discussed, so as to coat, but not fill, the structured micro grooves. A first TBC layer is deposited as described above, to form the micro channels at the interface between the bond coat and the ceramic topcoat. At least one micro groove is in communication with the cooling fluid supply to provide cooling fluid in the subsequent micro channel, as described above. Optionally, a second, denser outer layer of TBC may be added to the first TBC layer to further direct the flow of cooling fluid.

In still another embodiment of the present invention, a bond coat 2 and first layer 8 of TBC is applied to a relatively smooth component substrate 4 using known techniques. If necessary, at least one hole is machined for example, using a laser, through bond coat 2 and first layer 8 of TBC, and if necessary, through substrate 4, to communicate with the cooling fluid supply, to allow for flow of cooling fluid as previously set forth. Structured micro grooves are fabricated in the first TBC layer, and a second TBC layer is then applied using the shadowing technique as described above. In this manner, the location of the structured micro groove and hence, the micro cooling channel, may be placed at any preselected position within the first TBC layer. Optionally, a third, denser outer layer of TBC may be added to the second TBC layer to further direct the flow of cooling fluid The present invention also comprises the actively cooled thermal barrier coating system formed by the above described process and the component that includes the actively cooled thermal barrier coating system.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A process for forming a micro channel used to actively cool the flow path surface region of a gas turbine engine component extending into a gas flow path, comprising the steps of:

fabricating at least one structured micro groove in an outermost surface of the component, the micro groove extending substantially parallel to a first surface of a substrate for a predetermined length, and positioned along the outermost surface of the component adjacent to the gas flow path, the micro groove in fluid communication with at least one cooling fluid supply; and, shadowing at least one layer of material over the at least one structured micro groove such that at least one micro channel is formed, remaining in fluid communication with the at least one cooling fluid supply, the at least one layer of material forming a barrier between the gas flow path and the underlying substrate.

2. The process of claim 1 wherein the at least one structured micro groove is fabricated by the process selected from the group consisting of laser machining, electro-chemical machining (ECM), electro-discharge machining (EDM) and photolithography.

3. The process of claim 1 wherein the at least one layer of material is shadowed using electron beam physical vapor deposition (EB-PVD).

4. The process of claim 1 wherein the at least one structured micro groove size and spacing are about 0.0005" to 0.010".

5. The process of claim 1 wherein the at least one structured micro groove size and spacing are about 0.002".

6. The process of claim 1 wherein the at least one micro channel formed by shadowing the at least one layer of material over the at least one structural microgroove extending substantially parallel to the first surface of the substrate further includes forming a plurality of micro channels extending in a mesh pattern substantially parallel to the first surface of the substrate.

7. The process of claim 1 further comprising the step of supplying a cooling fluid from the cooling fluid supply through the at least one micro channel such that the cooling fluid is expelled from the engine component into a gas stream in the gas flow path.

8. The process of claim 7 wherein the step of shadowing at least one layer of material further includes applying a first porous layer of material over the at least one structured micro groove, then applying a second layer of material over the first layer of material, the second layer being more dense than the first layer.

9. The process of claim 8 further including the step of applying a bond coat to the surface of the component so that the bond coat forms the outermost surface of the component prior to the step of fabricating.

10. The process of claim 7 wherein a bond coat is the outermost surface of the substrate and the at least one layer of material is a porous thermal barrier coating (TBC) applied over the bond coat.

11. The process of claim 8 further including the step of applying a bond coat over the outermost surface of the component after the step of fabricating and before the step of shadowing.

12. The process of claim 7 wherein the step of shadowing at least one layer of material further includes applying a first porous layer of material over the at least one structured micro groove, then applying a second porous layer of material over the first layer of material, the second layer having a different density than the first layer.

13. The process of claim 12 further including a step of applying a third layer of a material over the second porous TBC wherein the third layer is denser than the second porous TBC.

14. A flow path surface region of a gas turbine engine airfoil produced by the process of claim 7.

15. A cooling system for actively cooling a flow path surface region of a gas turbine airfoil comprising:

a substrate having a first surface adjacent the gas flow path;

a bond coat applied to the substrate first surface;

at least one coating material overlying the bond coat, an outer portion of the at least one coating material forming the gas flow path surface;

at least one micro channel formed by shadowing of the at least one coating material over at least one structured micro groove formed and positioned between the first surface of the substrate and the outer surface of the coating material, the at least one micro channel extending substantially parallel to the first surface of the substrate for a predetermined length, the at least one micro channel in fluid communication with at least one cooling fluid supply; and, means for expelling cooling fluid from the micro channel.

16. The cooling system of claim 15 wherein the at least one structured micro groove is fabricated by a process selected from the group consisting of laser machining, electro-chemical machining (ECM), electro-discharge machining (EDM) and photolithography.

17. The cooling system of claim 15 wherein the at least one coating material is shadowed using electron beam physical vapor deposition (EB-PVD).

18. The cooling system of claim 15 wherein the at least one coating material includes a porous ceramic thermal barrier coating overlying at least a portion of the bond coat.

19. The cooling system of claim 18 wherein the at least one coating material further includes a second thermal barrier coating more dense than the porous thermal barrier coating applied over the porous thermal barrier coating.

20. The cooling system of claim 15 wherein the bond coat is selected from the group consisting essentially of a diffusion aluminide bond coat and an MCrAl(X) bond coat, where M is an element selected from the group consisting essentially of nickel, cobalt, iron and combinations thereof, and X is an element selected from the group consisting essentially of gamma prime formers, solid solution strengtheners, reactive elements, grain boundary strengtheners and combinations thereof.

21. The cooling system of claim 20 wherein X is an element selected from the group consisting of Zr, Hf, Y and rare earth elements.

22. The cooling system of claim 15 wherein the structured micro groove is fabricated within the bond coat.

23. The cooling system of claim 15 wherein the structured microgroove is fabricated into the first surface of the substrate, after which the bond coat is then applied to the first surface of the substrate.

24. The cooling system of claim 15 wherein the structured micro groove is fabricated within the at least one coating material and below the outermost surface of the at least one coating material.

25. The cooling system of claim 15 wherein the structured micro groove size and spacing are about 0.0005" to 0.010".

26. The cooling system of claim 15 wherein the structured micro groove size and spacing are about 0.002".

27. The cooling system of claim 15 wherein the at least one micro channel further includes a plurality of micro channels extending substantially parallel to the first surface of the substrate and extending substantially parallel to the surface of the substrate in a mesh pattern, the mesh pattern in fluid communication with the cooling fluid supply.

* * * * *